US008622635B2

(12) United States Patent
Yen et al.

(10) Patent No.: US 8,622,635 B2
(45) Date of Patent: Jan. 7, 2014

(54) CONNECTOR HAVING FLOATABLE OPTICAL MODULE

(75) Inventors: Yu-Hung Yen, New Taipei (TW); Hui-Wen Yang, New Taipei (TW); Hsiang-Chi Wen, New Taipei (TW); Ting-Yen Chuang, New Taipei (TW); Pin-Han Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 111 days.

(21) Appl. No.: 13/155,408

(22) Filed: Jun. 8, 2011

(65) Prior Publication Data

US 2011/0299816 A1 Dec. 8, 2011

(51) Int. Cl.
*G02B 6/36* (2006.01)

(52) U.S. Cl.
USPC .............................. 385/89; 385/55

(58) Field of Classification Search
USPC ..................................... 385/89, 55
See application file for complete search history.

(56) References Cited

U.S. PATENT DOCUMENTS

| 3,611,266 A * | 10/1971 | Amis et al. ............... 439/550 |
| 4,440,368 A * | 4/1984 | Kitchen ................... 248/27.1 |
| 5,437,557 A * | 8/1995 | Sagano ..................... 439/72 |
| 5,619,604 A * | 4/1997 | Shiflett et al. ............ 385/59 |
| 5,807,104 A * | 9/1998 | Ikeya et al. .............. 439/73 |
| 6,019,521 A * | 2/2000 | Manning et al. ......... 385/77 |
| 6,085,003 A * | 7/2000 | Knight .................... 385/59 |
| 6,116,915 A * | 9/2000 | McDaniel et al. ........ 439/65 |
| 6,523,241 B1 * | 2/2003 | Hubert et al. ............ 29/451 |
| 7,090,521 B2 * | 8/2006 | Nishio et al. ............ 439/248 |
| 7,201,594 B2 * | 4/2007 | van der Mee et al. .... 439/247 |
| 7,422,488 B1 * | 9/2008 | Wu ......................... 439/676 |
| 7,699,663 B1 * | 4/2010 | Little et al. ............. 439/660 |
| 2001/0039128 A1 * | 11/2001 | Tateishi et al. .......... 439/71 |
| 2003/0179993 A1 * | 9/2003 | Shigenaga et al. ....... 385/33 |
| 2006/0105603 A1 * | 5/2006 | Nishio et al. ............ 439/247 |
| 2006/0141836 A1 * | 6/2006 | Van Der Mee et al. ... 439/247 |
| 2006/0239619 A1 * | 10/2006 | Luther et al. ............ 385/69 |
| 2008/0112707 A1 * | 5/2008 | Mongold ................. 398/117 |
| 2009/0324176 A1 * | 12/2009 | Cheng et al. ............ 385/73 |
| 2010/0080519 A1 * | 4/2010 | Ko et al. ................. 385/93 |
| 2010/0278490 A1 * | 11/2010 | Liao et al. ............... 385/90 |
| 2010/0290745 A1 * | 11/2010 | Liao et al. ............... 385/90 |

FOREIGN PATENT DOCUMENTS

| CN | 1089761 A | 7/1994 |
| CN | 201438224 U | 4/2010 |
| TW | 566104 | 12/2003 |

(Continued)

*Primary Examiner* — Charlie Peng
*Assistant Examiner* — Peter Radkowski
(74) *Attorney, Agent, or Firm* — Wei Te Chung; Ming Chieh Chang (57) ABSTRACT

A connector includes an insulating seat defining a receiving cavity opening forwards, an optical module movably received in the receiving cavity and an actuating device. The optical module defines lenses at a front mating face thereof and a first touch portion at a rear face thereof. The actuating device is located behind the rear face of the optical module to urge the optical module moving forwards. The actuating device includes a spring coil and a connecting member defining a second touch portion which is urged by the spring coil to contact with the first touch portion. One of the first touch portion and the second touch portion provides a vertex and the other provides a planar so as to arrive a vertex-to-planar contact relationship between the first touch portion and the second touch portion.

16 Claims, 14 Drawing Sheets

(56) References Cited

FOREIGN PATENT DOCUMENTS

| TW | 200900946 A | 1/2009 |
| TW | 370210 U * | 12/2009 |
| TW | 370856 U * | 12/2009 |
| TW | M370856 | 12/2009 |
| TW | 373062 | 1/2010 |

* cited by examiner

CONNECTOR HAVING FLOATABLE OPTICAL MODULE

BACKGROUND OF THE INVENTION

1. Field of the Invention

The present invention relates to a connector, more particularly to a connector having an optical module for transmitting optical data.

2. Description of Related Art

At present, Universal Serial BUS (USB) is a widely used input/output interface adapted for many electronic devices, such as personal computer and related peripherals. In 1994, Intel, HP, IBM, NEC etc. together founded USB-IF to define a spec of USB. Nowadays, USB-IF has published several editions for USB, and transmitting rate of USB has became higher and higher. As development of electronic industry, higher transmitting rate of USB based connection accessory is needed.

An optical universal serial bus (OUSB) has been disclosed to be adopted for optical data transmission. The OUSB includes a USB connector with a number of lenses embedded in the USB connector and further connected with respective fibers for transmitting optical signal. Therefore, the OUSB can transmit signals up to 10 Gbps. However, as the lens are fixed to the USB connector, and they may fail to mate with counterparts if excessive clearance exits in manufacturing process.

Hence, an improved connector with a floatable optical module is desired to overcome the above problems.

BRIEF SUMMARY OF THE INVENTION

A connector comprises an insulating seat, an optical module and an actuating device. The optical module defines a receiving cavity opening forwards and a receiving room at an opposite side of the receiving cavity and a plurality of conductive terminals exposing in the receiving room. The optical module is movably received in the receiving cavity along a front and rear direction, which defines lenses at a front mating face thereof and a first touch portion at a rear face thereof. The actuating device is located behind the rear face of the optical module to urge the optical module moving forwards. The actuating device comprises a spring coil and a connecting member defining a second touch portion which is urged by the spring coil to contact with the first touch portion. One of the first touch portion and the second touch portion provides a vertex and the other of the first touch portion and the second touch portion provides a planar so as to arrive a vertex-to-planar contact relationship between the first touch portion and the second touch portion.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. For the most part, details concerning timing considerations and the like have been omitted inasmuch as such details are not necessary to obtain a complete understanding of the present invention and are within the skills of persons of ordinary skill in the relevant art.

Figure 1:
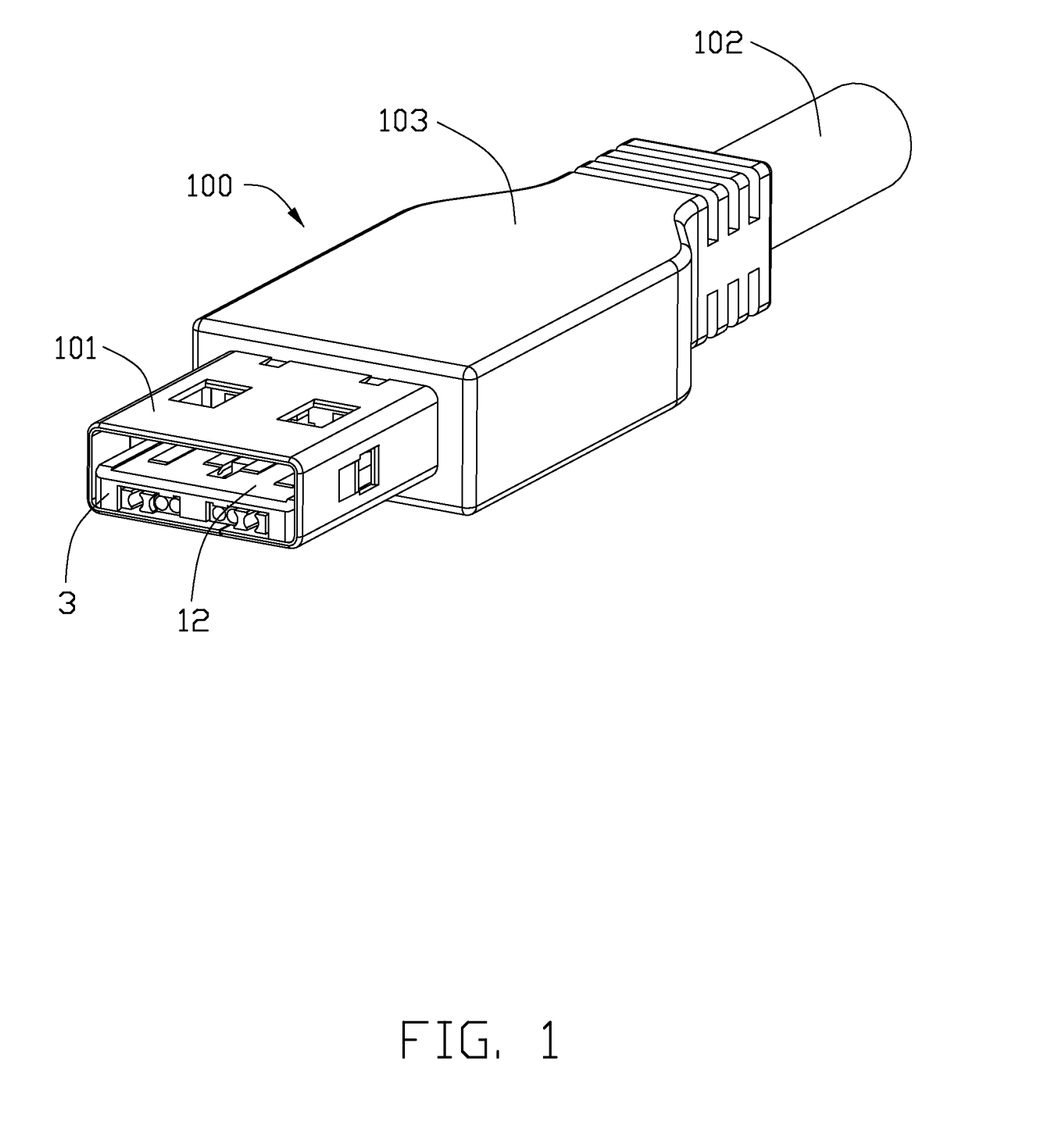
FIG. 1 is a perspective view of a connector according to a first embodiment of the present invention.
Figure 2:
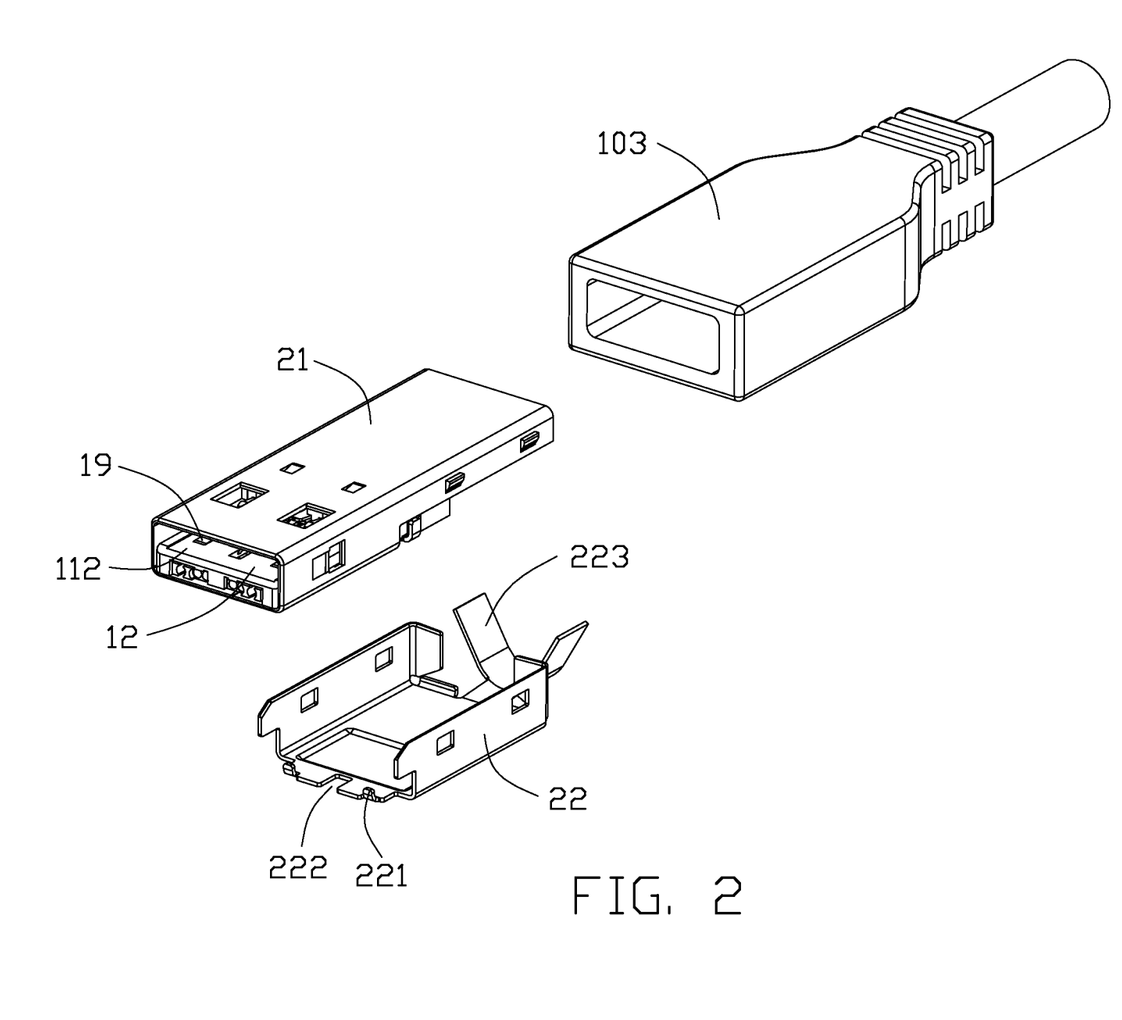
FIG. 2 is a partially exploded perspective view of the connector shown in FIG. 1.
Figure 3:
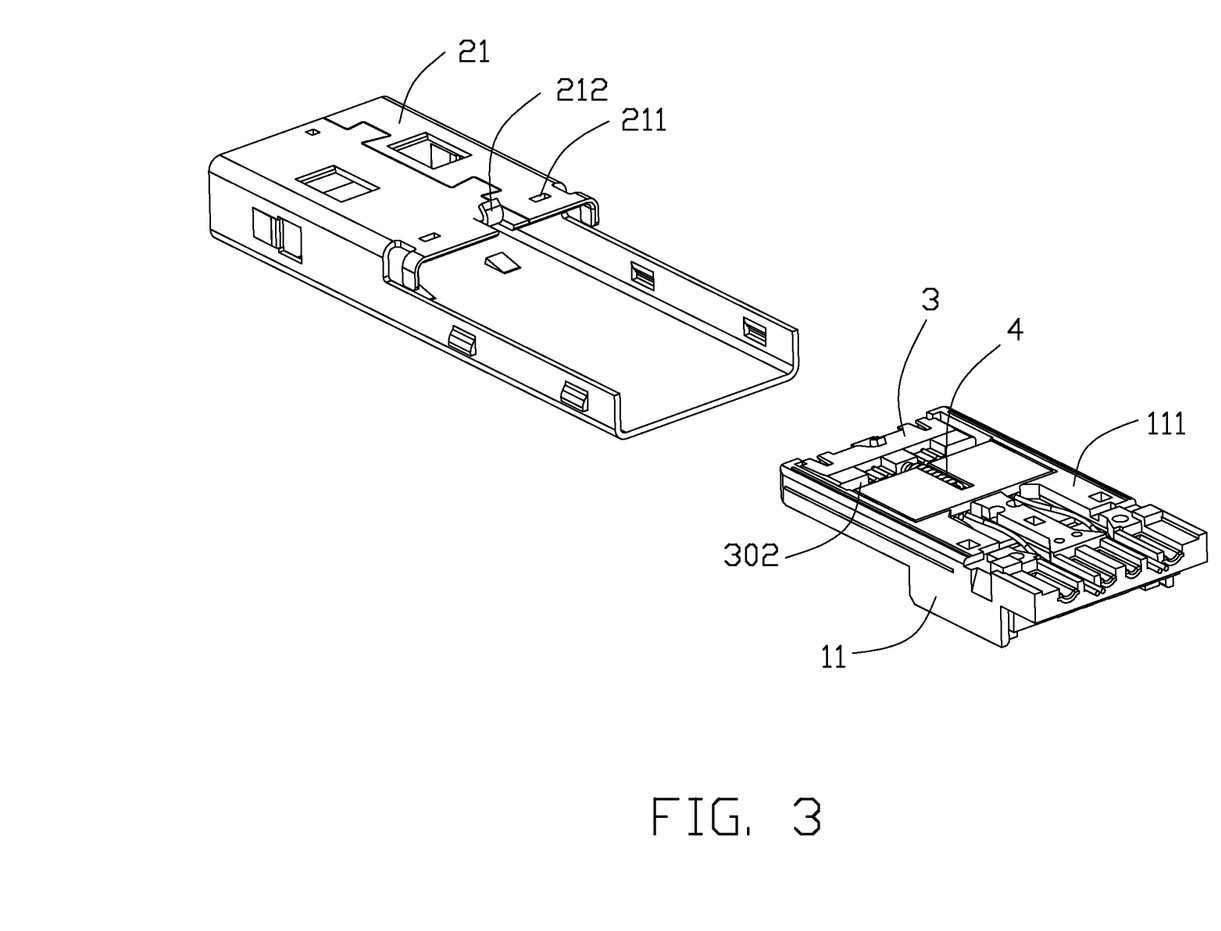
FIG. 3 is an exploded perspective view of an insulating seat and a first metal shell shown in FIG. 2.

Referring to FIGS. 1-3 showing a cable connector 100 according to the present invention of a first embodiment, the cable connector is a plug of a USB connector cable assembly and includes a plug mating end 101, a cable end 102 and insulating shell 103 between said two ends for protecting. A rectangular first metal shell 21 encloses an insulating seat 11, wherein the seat are at a lower face 111 located with an optical module 3 thereof to form a first mating port and an actuating device 4 biasing the first mating port to move in a front-and-back direction. Combination with FIG. 6, the seat is at an upper surface 110 loaded with a plurality of conductive terminals 19a, 19b. The first metal shell 21 enclosing the seat spaces away the upper surface 110 of the seat to be configured with a rectangular receiving room 12 in which the terminals 19a, 19b project to form a second mating port for electrical connection. In this embodiment, the two rows of terminals are compliable to USB 3.0 protocol, thereby the second mating end is compliable to USB standard. The optical module 3 is located under the receiving room 12 separated from the receiving room by the seat 11. A front half of the first metal shell 21 encloses the seat and a rear half of the first metal shell is adapted for covering optical fibers. A second metal shell 22 encloses a bottom face of the seat, thereby in combination with the first metal shell shielding transmission signals therein. The second metal shell 22 bend two barbs 221 from a front edge thereof and a notch disposed in said two barbs 221.

The barbs are retained in corresponding openings 211 defined on the first metal shell 21. The notch 222 are retained with a barb 212 defined on the first metal shell 21. The second metal shell defines a cable retaining wing 223 at a rear edge thereof.

Figure 4:
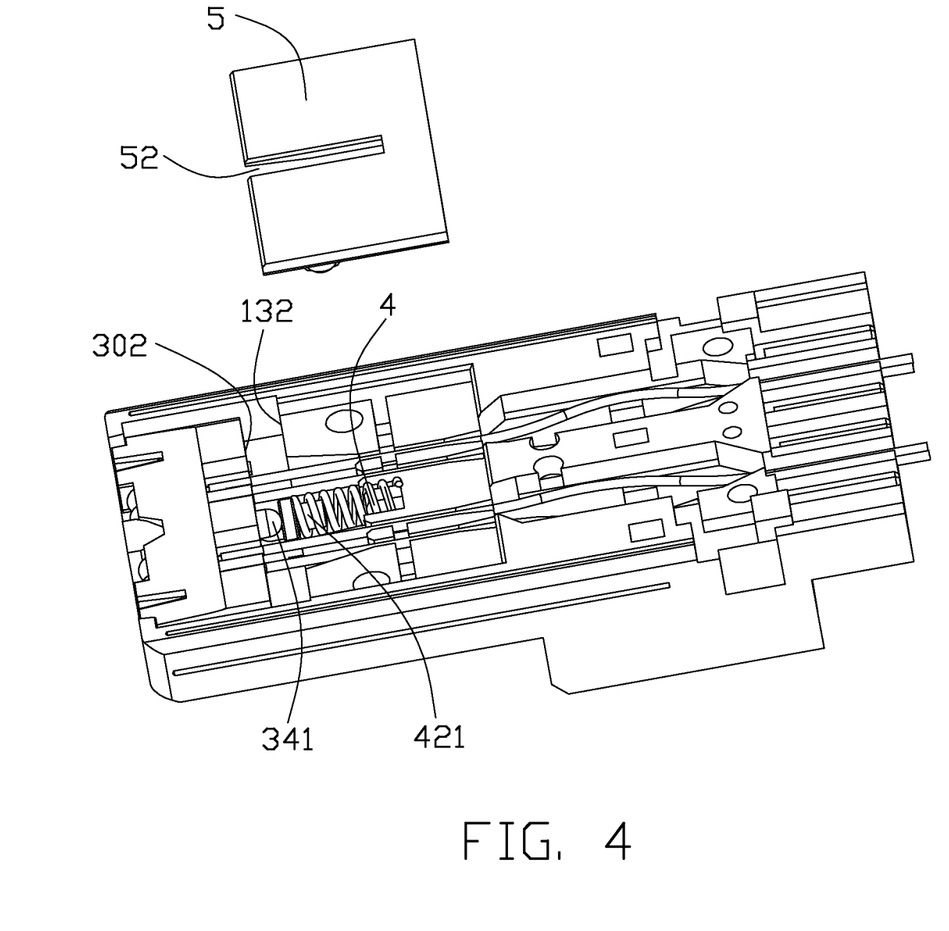
FIG. 4 is a partially exploded perspective view of the insulating seat shown in FIG. 3.
Figure 5:
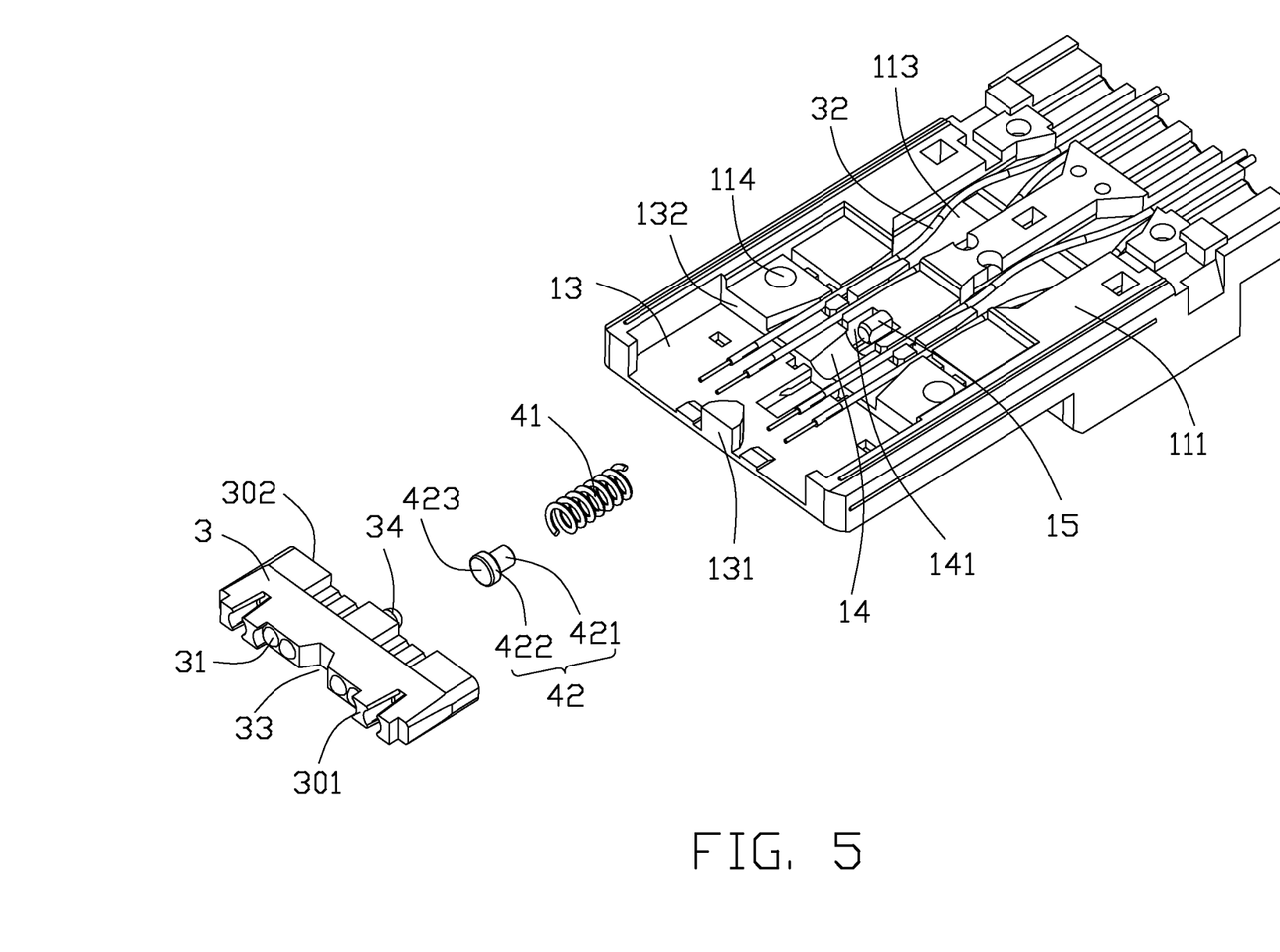
FIG. 5 is an exploded perspective view of the insulating seat shown in
FIG. 4 without a cover.
Figure 6:
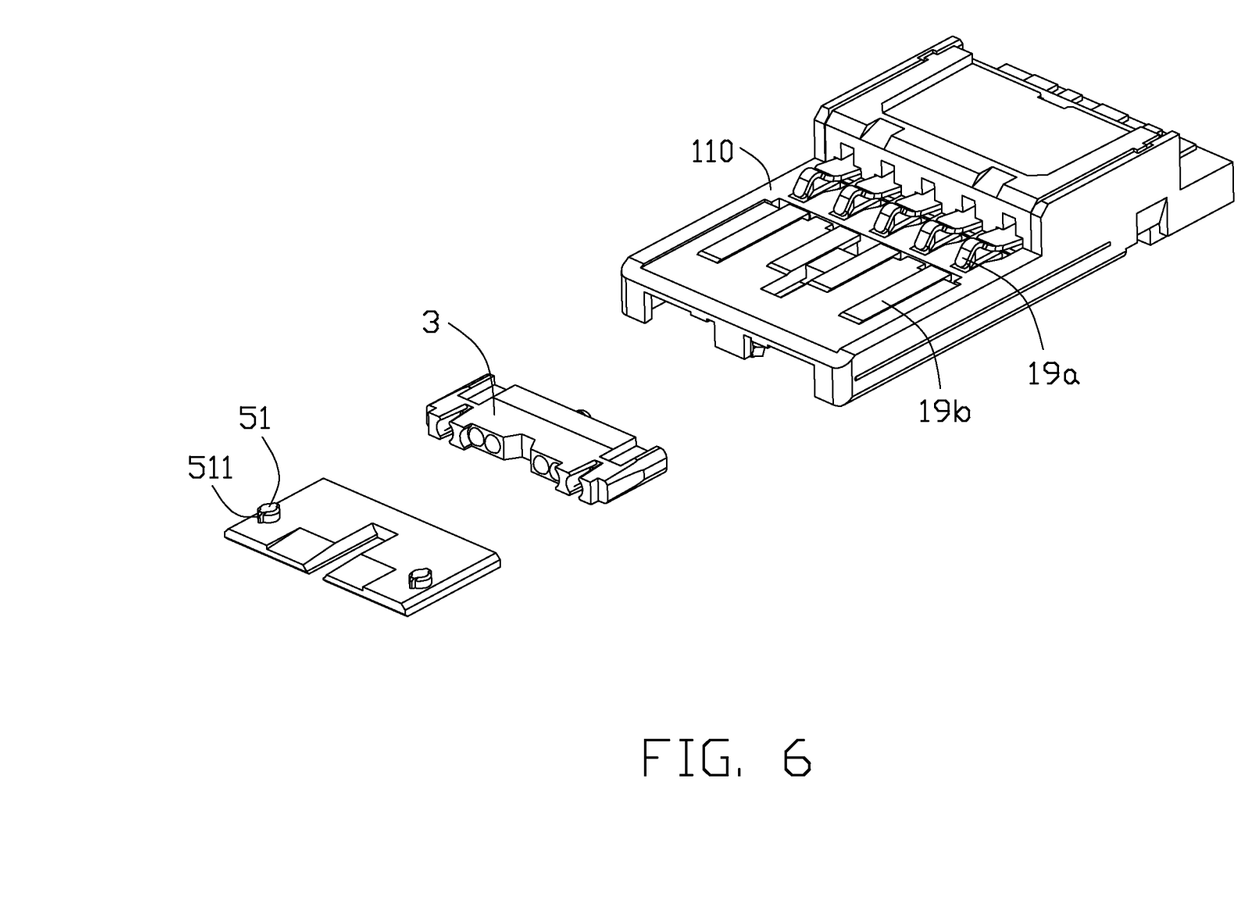
FIG. 6 is an exploded perspective view of the insulating seat shown in
FIG. 4 without a cover from another view.

Referring to FIGS. 4 and 5, the seat defines a receiving cavity 13 at a front of the lower surface 111 which separates from the terminals to receive the optical module 3 at a front thereof. The optical module 3 includes lenses 31 at a front mating surface 301, which at a rear edge thereof connect with optical fiber cables 32 received in the grooves 113 in the lower surface of the seat. The actuating device 4 is received in a rear of the receiving cavity 13 behind the optical module. A retaining board 5 is disposed to limit the actuating device in the upper to lower direction, wherein a pair of short post 51 best shown in FIG. 6 are inserted in and retained in the holes 114 and a slot 52 are used for spring coil 41. The short posts 51 define a pair of rib 511 at an outer periphery to increase interference with the holes.

The receiving cavity 13 is larger than the optical module 3 in the front-and-rear direction, so the optical module can move in the front-and-rear direction. In a free or original statute no exterior force exerted on the lenses, the optical module is forwardly biased so as to be in a front-most of the receiving cavity 13 by the actuating device 4 and limited by the V-shape notch 33 of the lens being lodged against a boss 131 projecting upright from a bottom of the receiving cavity 13 so as to prevent the optical module 4 forwardly separating from the receiving cavity 13. When the optical module 3 is mated with a counter optical module, the optical module is driven to inwardly move wherein a rear face 302 are blocked against the inside rear wall 132 of the receiving cavity 13. The counter module also will partially slide in the receiving cavity 13 to increase alignment of said two modules. The actuating device 4 will be introduced hereinafter.

The optical module 4 project a first connecting post 34 from a middle position of the rear face 302 thereof. The first connecting post defines a convex circular surface 341 such as a hemi-sphere at a front free end thereof which is functioned as a first touch portion. The convex circular surface 341 has a vertex at a rear most thereof. The seat defines a recess 14 near to the receiving cavity 13 at the lower surface 111 and a positioning post 15 forwardly extending from a forward inside wall of the recess 14 in the front and rear direction. The positioning post 15 does not arrive to the inside rear face 132 of the receiving cavity. The recess 14 is shaped with semi-cylinder inside face. A spring coil 41 is set in the recess 14 and connects with the positioning post 15 at one end thereof. A connecting member 42 includes a large head 422 and a cylinder second connecting post 421. The head 422 is constructed with a plane top face 423 which is functioned as a second touch portion. The second connecting post 421 connects with another end of the spring coil 41. The spring coil 41 and the connecting member 42 are commonly formed as said actuating device. As best shown in FIG. 4, the first touch portion is just pressed against a second touch portion biasing by the spring coil 41 to arrive a contact relationship of the actuating device and the optical module. The elastic force of the spring coil 41 pushes the optical module 3 to separate from the inside rear face 132 of the receiving cavity with a distance which is called said original statute. In response to the optical module 3 shifted rearward by the counter optical module, the first touch portion pressing against the second touch portion 423 urge the spring coil 41 rearwards move so that the optical module has forward moving tendency. Please notes, the spring coil 41 is just slidingly located in the recess 14 to arrive an only front-and-rear shift. The inside walls 141 at two side of the positioning post 15 benefit the spring coiling in the positioning post.

As aforementioned, a vertex-planar contact pattern of the first and the second touch portion is formed to decrease lateral decomposed forces, thereby avoiding undesired skew of the optical module 3. A small skew of the first connecting post 34 also will be revised by the spring coil 41. Combination with FIG. 3, the forward slot 52 of the retaining board 5 allows the spring coil shift therein with no inference or a small interfere. The dimension of the second connecting post 421 and the positioning post 15 along the front and rear direction should match spring coil 41.

Figure 7:
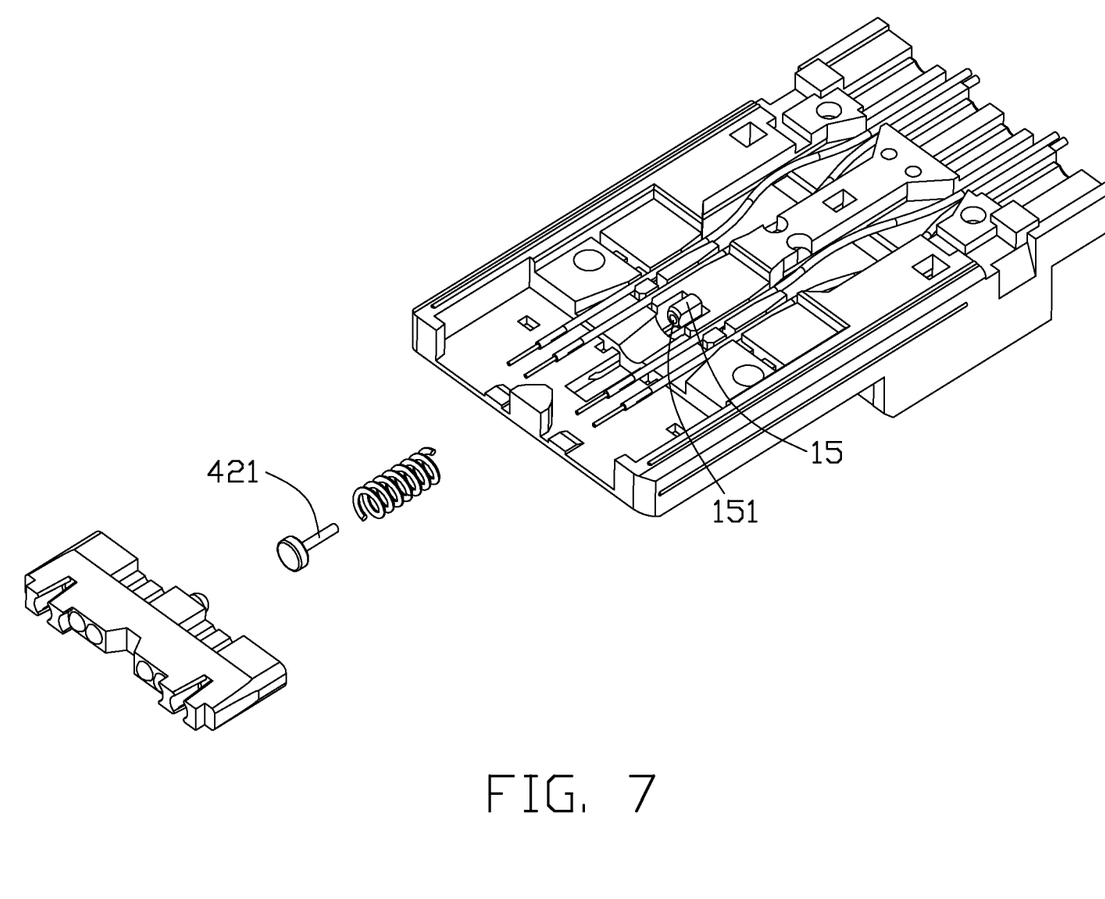
FIG. 7 is similar to FIG. 5, showing an alternative embodiment of the first embodiment.

FIG. 7 shows an approximate embodiment of the first embodiment. The second connecting post 421 of the actuating device 4 becomes smaller, while the positioning post 151 becomes larger to define a hole 151 to receive the second connecting post 421, thereby arriving a fitly connection between second connecting post, spring coil and the positioning post. The second connecting post 421 slides in the holes 151 in the front and rear direction. Alternatively, the second connecting post can designed larger to define said hole 151 which is inserted with a smaller positioning post 421.

Other embodiments will be given hereinafter wherein same constructs will omit.

Figure 8:
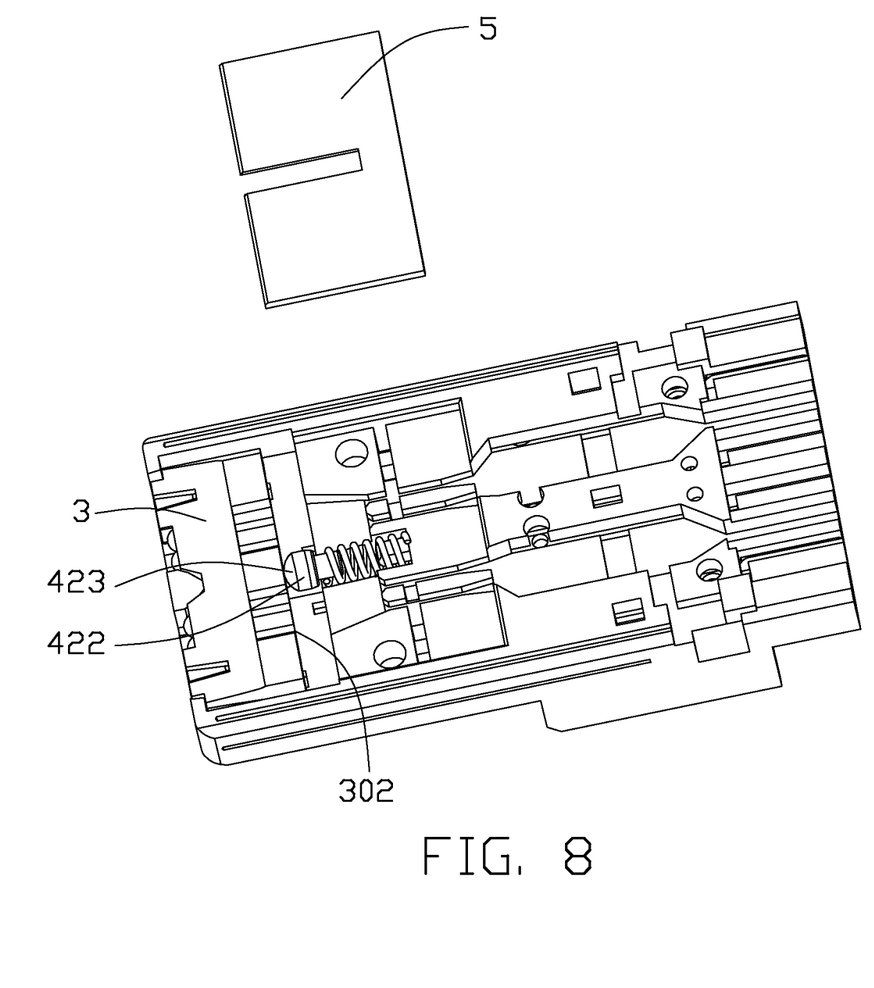
FIG. 8 is an exploded perspective view of an insulating seat of a second embodiment of the present invention.
Figure 9:
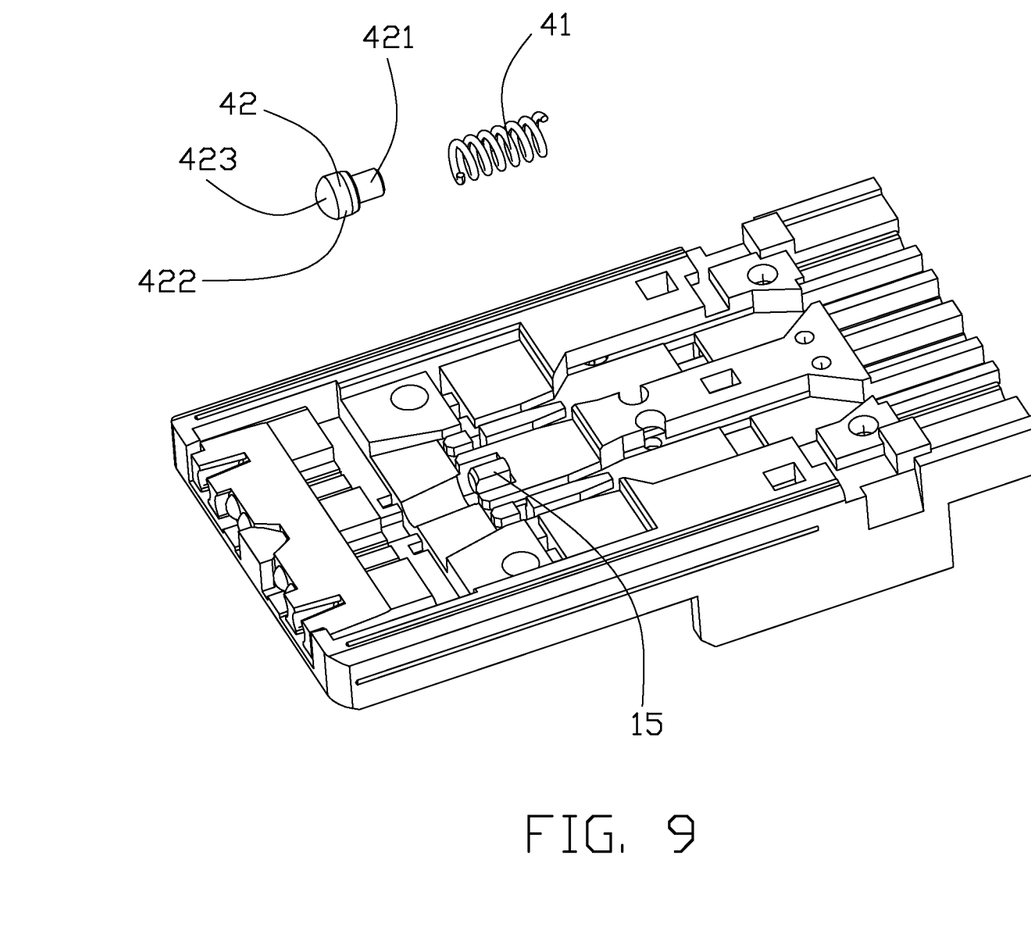
FIG. 9 is an partially exploded perspective view of the insulating seat shown in FIG. 8.

FIGS. 8 and 9 show a second embodiment of the present invention. The rear face 302 of optical module 3 is shaped in a planar and provides a first touch portion. The head 422 of the connecting member 42 is shaped with a circular surface 423 at a front free end thereof which is functioned as a second touch portion. The second touch portion has a vertex at a front most thereof. Therefore, a vertex-to-planar contact relationship is formed by the optical module 3 and the actuating device 4. The spring coil 41 is engaged with the second connecting post 421 and the positioning post 15 at two ends thereof.

Figure 10:
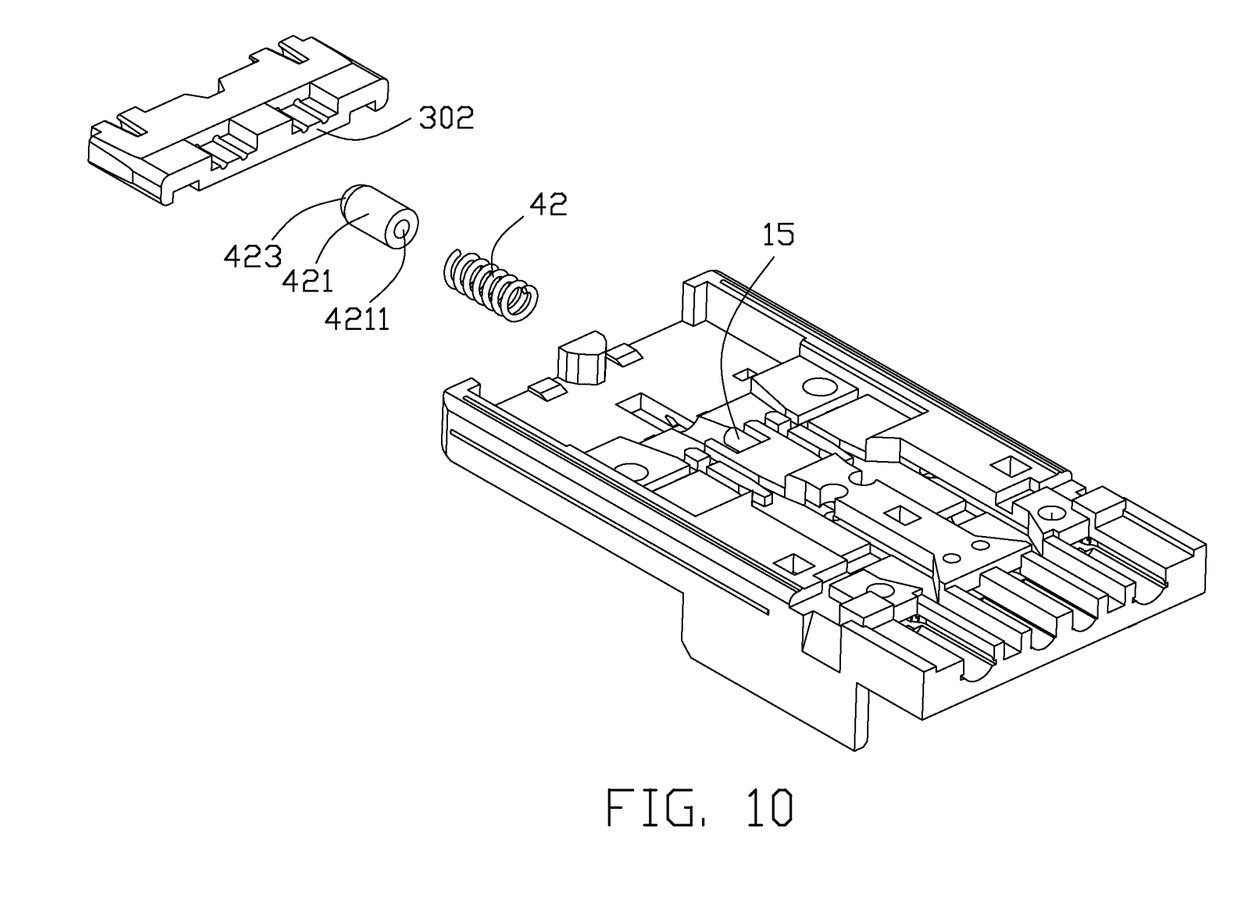
FIG. 10 is similar to FIG. 9, showing an alternative embodiment of the second embodiment.

FIG. 10 shows an approximate embodiment of the second embodiment. The second connecting post 421 becomes larger so that the second connecting post 421 is same to the head in diameter. The enlarged second connecting post opens a hole 4211 to be inserted with the positioning post 15. Besides the circular surface, the second touch portion can be formed by a cone or dimples projecting from a planar surface.

Figure 11:
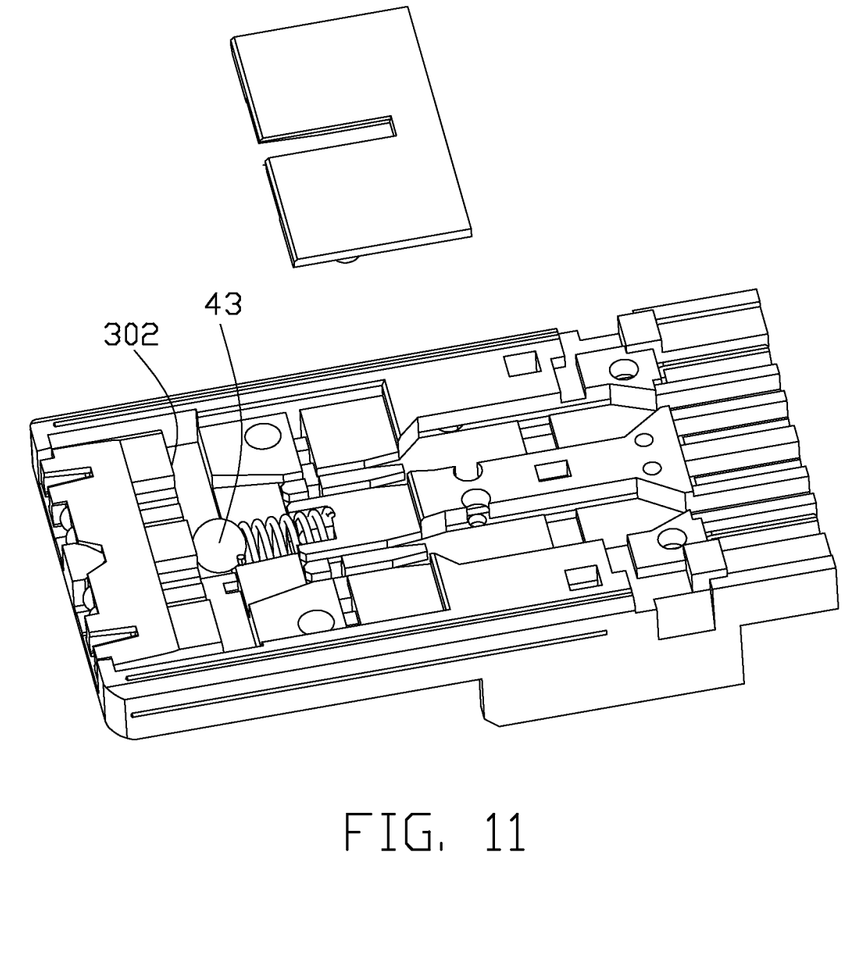
FIG. 11 is an exploded perspective view of an insulating seat of a third embodiment of the present invention.
Figure 12:
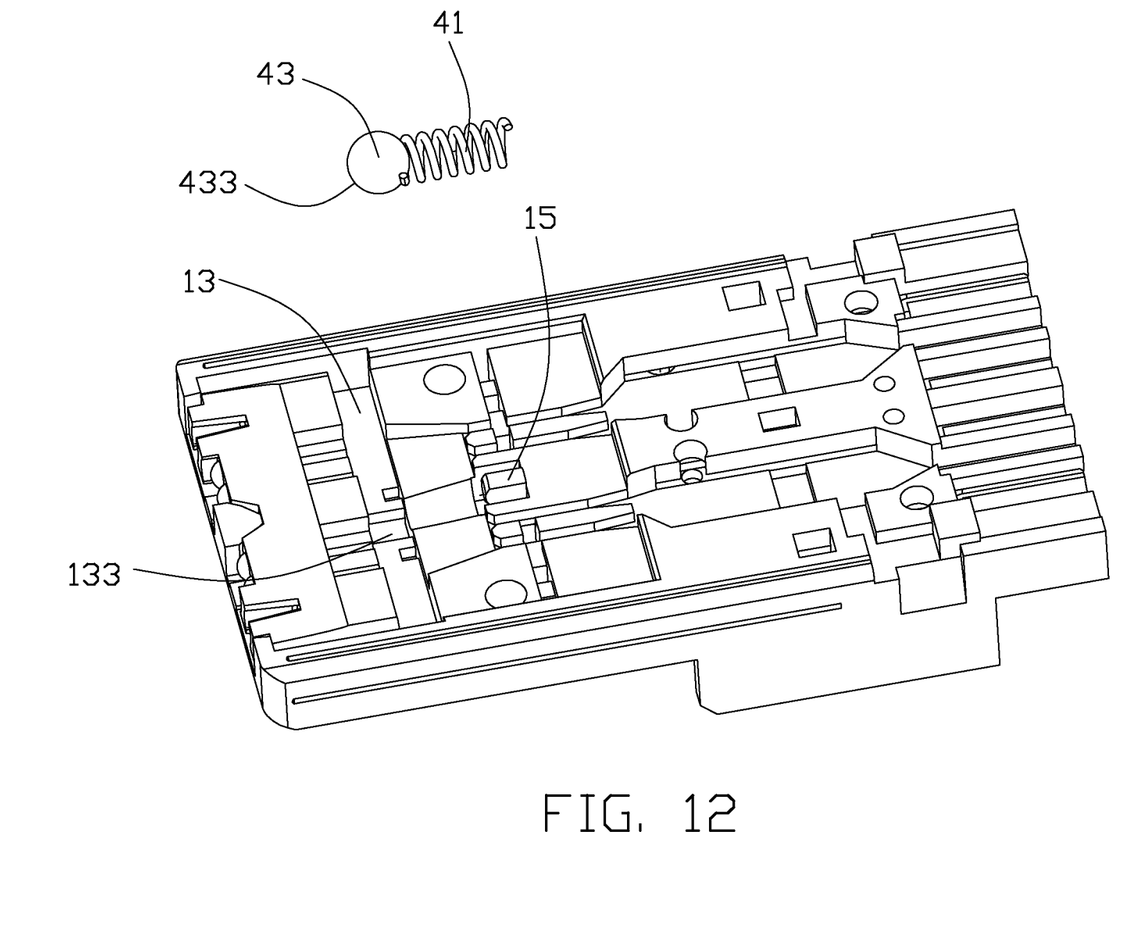
FIG. 12 is an exploded perspective view of the insulating seat shown in FIG. 11.

Referring to FIGS. 11 and 12 showing a third embodiment of the present invention, the connecting member 43 is construed with a ball which is located at one end of the spring coil 41. An opposite side of the ball to a position connecting with the spring coil provides a second touch portion 433. The rear face 302 of the optical module 3 provides a first touch portion. Therefore, a vertex-to-planar contact relationship also is formed. The receiving cavity 13 defines a recessed groove 133 at a bottom face thereof to accommodate with parts of the ball to limit the ball's movement.

Figure 13:
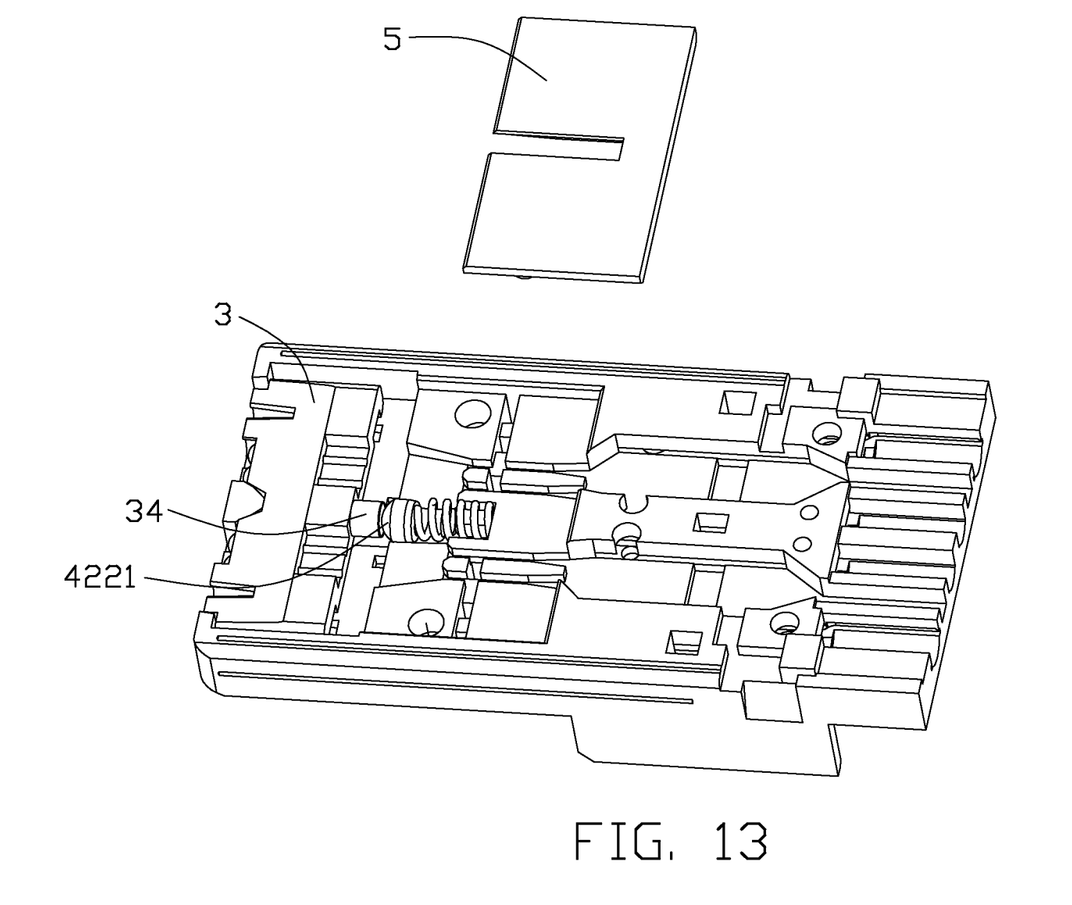
FIG. 13 is an exploded perspective view of an insulating seat of a forth embodiment of the present invention.
Figure 14:
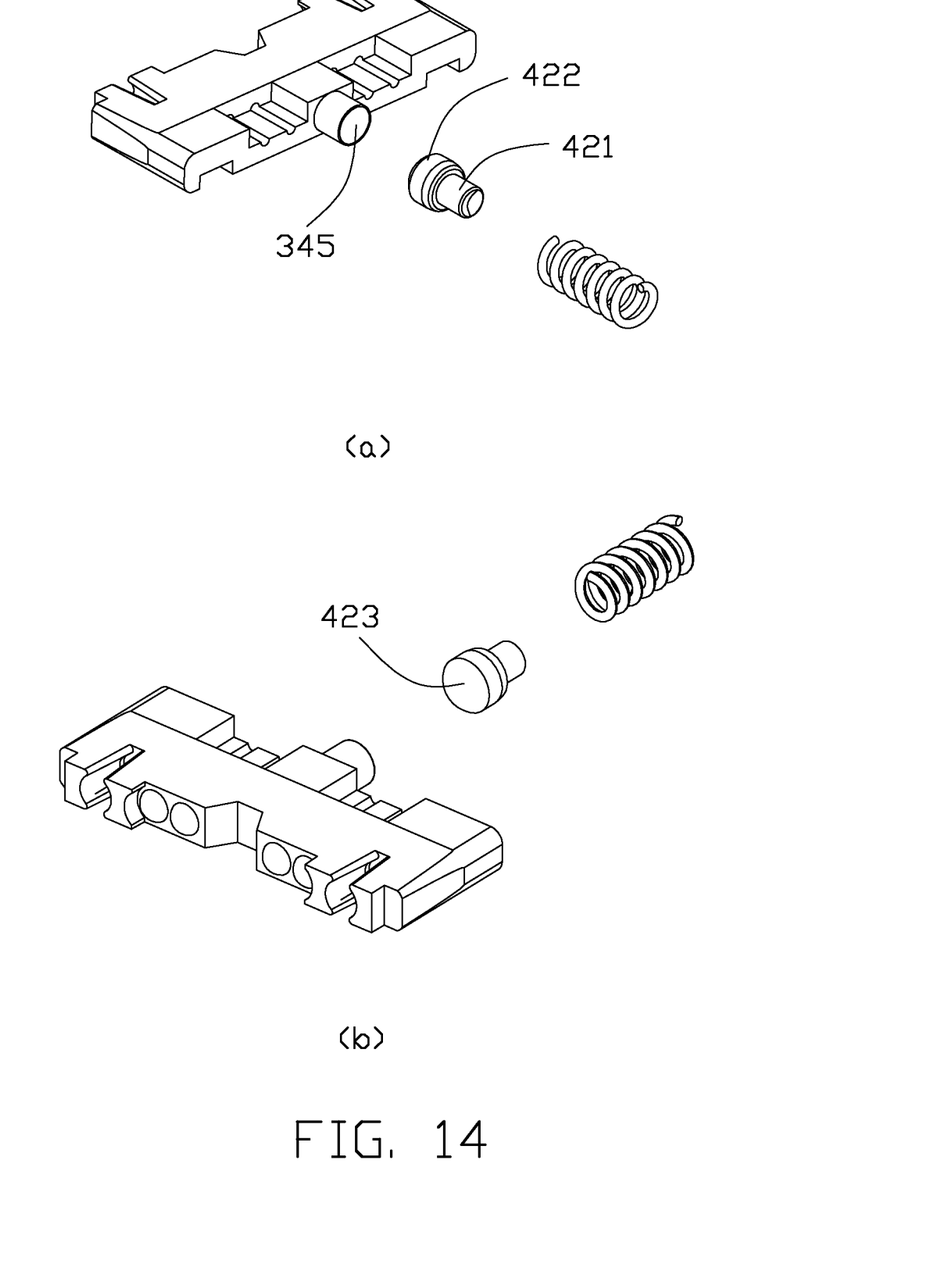
FIGS. 14(a) and 14(b) are exploded perspective views of an actuating device shown in FIG. 13.

Referring to FIGS. 13 and 14a, 14b showing a forth embodiment of the present invention. The rear face 302 of the optical module project a cylinder second connecting post 34 which has a concave circular surface 345 at free end. The a concave circular surface 345 is functioned as a first touch portion. The head 422 of the connecting member 42 has a convex circular surface 423 which is functioned as a second touch portion 4221. Therefore the first touch portion and the second touch portion is constructed with face-to-face contact pattern. A multi-direction contact relationship is formed between the optical module and the actuating device through the face-to-face contact. The multi-direction contact also can decrease lateral decomposed forces, thereby avoiding undesired skew of the optical module 3.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A connector comprising:
an insulating seat defines a receiving cavity opening forwards and a receiving room at an opposite side of the receiving cavity, a plurality of conductive terminals exposing in the receiving room;
an optical module defining lenses at a front mating face thereof and a first touch portion at a rear face thereof;
an actuating device located behind the rear face of the optical module to urge the optical module moving forwards, the actuating device comprising a spring coil and a connecting member, the connecting member integrally defining a second touch portion which is urged by the spring coil to contact with the first touch portion and a second connecting post received in a front end of the spring coil so that the connecting member engage the positioning post;
wherein one of the first touch portion and the second touch portion provides a vertex and the other of the first touch portion and the second touch portion provides a planar so as to achieve a vertex-to-planar contact relationship between the first touch portion and the second touch portion;
wherein the insulating seat defines a positioning post integrally extending towards the receiving cavity and received in a rear end of the spring coil so that the spring coil engages the positioning post.

2. The connector according to claim 1, wherein the optical module defines a first connecting post projecting rearwards from the rear face thereof, the first connecting post defines a circular convex surface with a vertex at a rear free end thereof which forms said first touch portion, the connecting member defines a planar front free end thereof which forms said second touch portion.

3. The connector according to claim 2, wherein the connecting member comprises a head and the second connecting post, the second connecting post connects with the spring coil at another end opposite to the first positioning post, the head defines said planar front free end.

4. The connector according to claim 3, wherein one of the second connecting post and the positioning post defines a hole to receive the other of the first connecting post and the positioning post.

5. The connector according to claim 1, wherein the optical module defines a planar at the rear face thereof which functioned as the first touch portion, the connecting member defines a convex circular surface with a vertex at a front free end thereof which forms said second touch portion.

6. The connector according to claim 5, wherein the connecting member comprises a head and a second connecting post, the second connecting post connects with the spring coil at another end opposite to the first positioning post, the head defines said convex circular surface at a front free end thereof.

7. The connector according to claim 6, wherein one of the second connecting post and the positioning post defines a hole to receive the other of the first connecting post and the positioning post.

8. The connector according to claim 1, wherein the connecting member is a ball discrete from the spring.

9. A connector comprising:
an insulative housing defining a receiving cavity;
an optical module back and forth moveable in the receiving cavity along a front-to-back direction and providing lenses on a front end to define an optical mating port, and a first touching portion on a rear portion;
a plurality of fibers located behind and linked to the optical module;
an actuating device essentially located behind the optical module and including a spring equipped with a connecting member providing thereon and a second touching portion which forwardly contacts the first touching portion to constantly urge the optical module to move forward; wherein
one of the first touching portion and the second touching portion defines a convex structure and the other defines a planar structure constantly contacting said convex structure to commonly form a point-to-plane contact therebetween; wherein
said convex structure defines a circular configuration in an elevational view; wherein
said spring is a coil spring with a circular cross-section and a center axis aligned with that of the convex structure; wherein
said housing defines at least a semi-cylindrical recess snugly receiving said coil spring therein.

10. The connector as claimed in claim 9, wherein the connecting member is discrete from the spring.

11. The connector as claimed in claim 9, wherein there is only one point-to-plane contact between the optical module and the actuating device.

12. The connector as claimed in claim 9, wherein said connecting member includes integrally a head on which the second touching portion is formed, and a post located behind said head and circumferentially confined with the spring.

13. The connector as claimed in claim 9, wherein a retaining board is assembled to the housing to cooperate with the housing for holding the actuating device therebetween in a vertical direction perpendicular to said front-to-back direction.

14. The connector as claimed in claim 12, wherein said convex structure is formed on said head.

15. A connector comprising:
an insulative housing comprising a tongue seat, the tongue seat defining a first face and a second face opposite to the first face;
a metallic shell fitly surrounding the tongue seat, thereby defining a first mating cavity between the first face of the tongue seat and the metallic shell and a second mating cavity between the second face of the tongue seat and the metallic shell;
an optical module moveable in the first mating cavity along a front-to-back direction, and providing lenses on a front end thereof and a first touching portion on a rear portion thereof;
a plurality of fibers located behind and linked to the optical module;
an actuating device essentially located behind the optical module and including a spring equipped with a connecting member providing thereon and a second touching portion which forwardly contacts the first touching portion to constantly urge the optical module to move forward;

a plurality of conductive terminals with contacting portion arranged on the second face and exposing to the second mating cavity;

wherein the first touching portion and the second touching portion are disposed between two adjacent lenses in a lateral direction perpendicular to the front-to-back direction;

wherein the first touching portion and the second touching portion provide a constantly multi-direction contact therebetween.

16. The connector as claimed in claim 15, wherein one of the first touching portion and the second touching portion is a convex circular surface and the other of the first touching portion and the second touching portion is a concave circular surface.

\* \* \* \* \*